No. 858,146. PATENTED JUNE 25, 1907.
L. BORSUM.
PHOTOGRAPHIC FOCAL PLANE SHUTTER.
APPLICATION FILED OCT. 19, 1905.
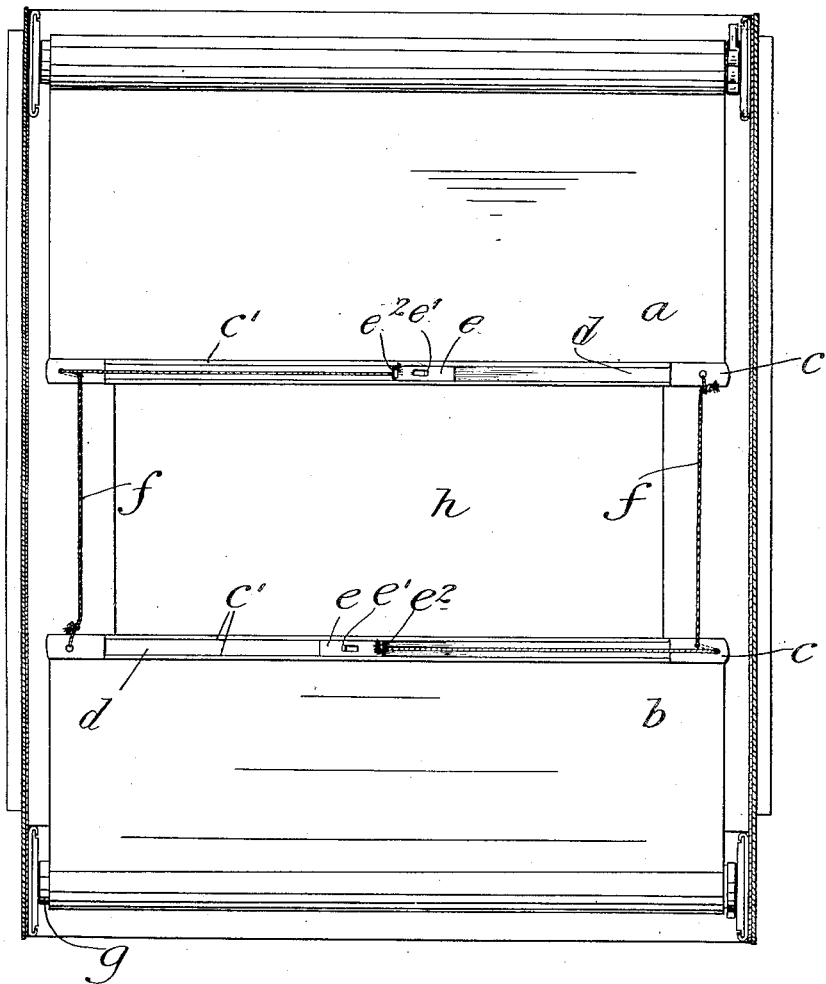

UNITED STATES PATENT OFFICE.

LOUIS BORSUM, OF PLAINFIELD, NEW JERSEY.

PHOTOGRAPHIC FOCAL-PLANE SHUTTER.

No. 858,146.　　　　Specification of Letters Patent.　　　　Patented June 25, 1907.

Application filed October 19, 1905. Serial No. 283,421.

*To all whom it may concern:*

Be it known that I, LOUIS BORSUM, a citizen of the United States, residing at Plainfield, county of Union, State of New Jersey, have invented certain new and useful Improvements in Photographic Focal - Plane Shutters, of which the following is a specification.

The object of this invention is to improve the means of adjusting the slit openings between the shutter sections, and, at the same time to have the adjacent edges of the shutter straight and symmetrical. To this end there is attached to each of the edges of the shutter sections, a straight stiff edge-strip, which may be of sheet metal compressed upon the edge of the flexible material of which the shutter sections are formed and which is provided upon its side with an open under-cut way in which a frictionally held adjusting slide works. A cord attached to each slide is passed in a special way, hereinafter described, through the end of the strip upon which the slide is mounted and is then attached to the corresponding end of the other strip.

In the accompanying drawings: Figure 1 is a front elevation showing upper and lower shutter sections with the adjusting means applied thereto. Fig. 2, a transverse detail section on an enlarged scale through one of the shutter edges: and Fig. 3, a detail view showing the friction plate.

The upper and lower shutter sections are marked respectively $a$ and $b$. Each has secured to its edge a stiff edge strip $c$ which may appropriately be composed of sheet metal bent into the form indicated by the sectional view (Fig. 2) and compressed upon the edge of the flexible material. One side face of this strip, that one most convenient of access, is provided with a dove-tail or under cut way $d$ formed, in the construction shown, by the overturned edges $c'$ of a metal strip secured to strip $c$. In each of these guides or ways is fitted a curved or arched spring plate $e$ formed or so shaped that, when inserted, it is more or less flattened and by its spring reaction makes frictional contact with the bottom and overhanging sides of the way. It is provided with an appropriate projection $e'$ that may be formed by cutting and turning out the metal of which it is made. One end $e^2$ of the slide is turned up and apertured. Each slide is equipped with an adjusting cord secured at $e^2$, passing thence through an aperture in the end of its strip, then to the front again through an aperture in the same strip nearer the slide, and then to the corresponding end of the opposite strip to which it is secured. This arrangement affords a ready and convenient means of adjustment and maintains, during adjustment, parallelism of the strips $c, c$. If the frictional engagement of the slides in their ways is sufficient to resist the strain of the spring roll $g$ of the shutter, the slits may be adjusted as desired by shifting by hand the slides $e$ in their ways.

$h$ is the exposure opening of the camera.

I claim:

In a photographic focal plane shutter, the combination with the shutter sections, of stiffening strips applied to their edges, slides movable on such strips, and a flexible cord connection extending from each slide through the end of the strip on which it is mounted, thence to the front again through an aperture in the same strip nearer the slide, and then to the corresponding end of the opposite strip to which it is secured.

In testimony whereof, I have hereunto subscribed my name.

LOUIS BORSUM.

Witnesses:
　L. F. BROWNING,
　E. F. WICKS.